(12) United States Patent
Klein

(10) Patent No.: US 9,760,649 B2
(45) Date of Patent: Sep. 12, 2017

(54) COMPUTERIZED NATIONAL ONLINE PARCEL-LEVEL MAP DATA PORTAL

(71) Applicant: Boundary Solutions, Inc., Mill Valley, CA (US)

(72) Inventor: Dennis H. Klein, Mill Valley, CA (US)

(73) Assignee: BOUNDARY SOLUTIONS, INC., Mill Valley, CA (US)

(*) Notice: Subject to any disclaimer, the term of this patent is extended or adjusted under 35 U.S.C. 154(b) by 670 days.

(21) Appl. No.: 14/120,145

(22) Filed: Apr. 29, 2014

(65) Prior Publication Data

US 2014/0237410 A1     Aug. 21, 2014

Related U.S. Application Data

(60) Continuation of application No. 13/295,274, filed on Nov. 14, 2011, now Pat. No. 9,501,209, which is a
(Continued)

(51) Int. Cl.
*G06F 17/30* (2006.01)
*G06Q 10/08* (2012.01)
(Continued)

(52) U.S. Cl.
CPC .... *G06F 17/30893* (2013.01); *G06F 3/04842* (2013.01); *G06F 17/30241* (2013.01); *G06Q 10/08* (2013.01); *G06Q 20/102* (2013.01); *G06Q 30/0601* (2013.01); *G06F 17/30958* (2013.01); *Y10S 707/92* (2013.01); *Y10S 707/99931* (2013.01); *Y10S 707/99934* (2013.01);
(Continued)

(58) Field of Classification Search
None
See application file for complete search history.

(56) References Cited

U.S. PATENT DOCUMENTS

| | | | |
|---|---|---|---|
| 5,519,809 | A | 5/1996 | Husseiny et al. |
| 5,559,707 | A | 9/1996 | DeLorme et al. |

(Continued)

OTHER PUBLICATIONS

Abel, David J., et al. "An Exploration of GIS Architectures for Internet Environments", Computers, Environment and Urban systems 22.1 (1998), 7-23.

(Continued)

*Primary Examiner* — Tyler Torgrimson
(74) *Attorney, Agent, or Firm* — Lawrence Edelman; The Law Office of Lawrence Edelman

(57) ABSTRACT

A National Online Parcel-Level Map Data Portal (NPDP) is provided that optimizes online delivery of parcel-level maps and linked attribute data. To do this, the NPDP manages a database of assembled and current vector based parcel data in a spatial format (GIS) that enables geocoded parcel boundaries to be linked to property tax records. A user enters a street address into an appropriate screen window to call up and view road right-of ways, all parcel boundaries and the "exact" address location as a highlighted parcel area. In addition, a list of property record attributes such as owner, use code, assessed value and year constructed can be displayed. Other on screen parcels can likewise be selected if one wishes to view their linked attributes.

21 Claims, 11 Drawing Sheets

Related U.S. Application Data continuation of application No. 13/065,023, filed on Mar. 11, 2011, now Pat. No. 8,065,352, which is a division of application No. 12/380,690, filed on Mar. 2, 2009, now Pat. No. 7,912,880, which is a division of application No. 11/493,301, filed on Jul. 26, 2006, now Pat. No. 7,516,156, which is a division of application No. 10/347,102, filed on Jan. 17, 2003, now Pat. No. 7,092,957.

(60) Provisional application No. 60/353,656, filed on Jan. 18, 2002.

(51) Int. Cl.
*G06Q 20/10* (2012.01)
*G06Q 30/06* (2012.01)
*G06F 3/0484* (2013.01)

(52) U.S. Cl.
CPC ... *Y10S 707/99943* (2013.01); *Y10S 707/99944* (2013.01); *Y10S 707/99945* (2013.01)

(56) References Cited

U.S. PATENT DOCUMENTS

| | | |
|---|---|---|
| 5,966,135 A | 10/1999 | Roy |
| 6,732,120 B1* | 5/2004 | Du .................. G01C 21/20 707/743 |

OTHER PUBLICATIONS

Jeyapalan, Kandiah, et al., "GIS for a Small City Using GPS and Photogrammetry", International Archieves of Photogrammetry and Remote Sensing 29 (1993) 627-635.

Cobb, David A., et al., "Online GIS Service", The Journal of Academic Librarianship, 23.6 (1997), 484-497.

McCurley, Kenin S. "Geospatial Mapping and Navigation of the Web", Proceedings of the 10th International Conference on World Wide Web., ACM, 2001, 221-229.

* cited by examiner

USA County Boundary Map (USACM)
for Retrieving Parcel Data From Multiple Counties Custom Applications Development NPDP Data Acquisition and Maintenance Program Standard NPDP Address Match Feature
(Enter-an-Address-Retrieve-a-Parcel Map-And-Linked Attribute List)

Spatial Query using a Boolean Argument Across Multiple Attribute Fields

Thematic Mapping on a Single Attribute Field Value

Complex Thematic Mapping - Graduated map of feature previously selected by query

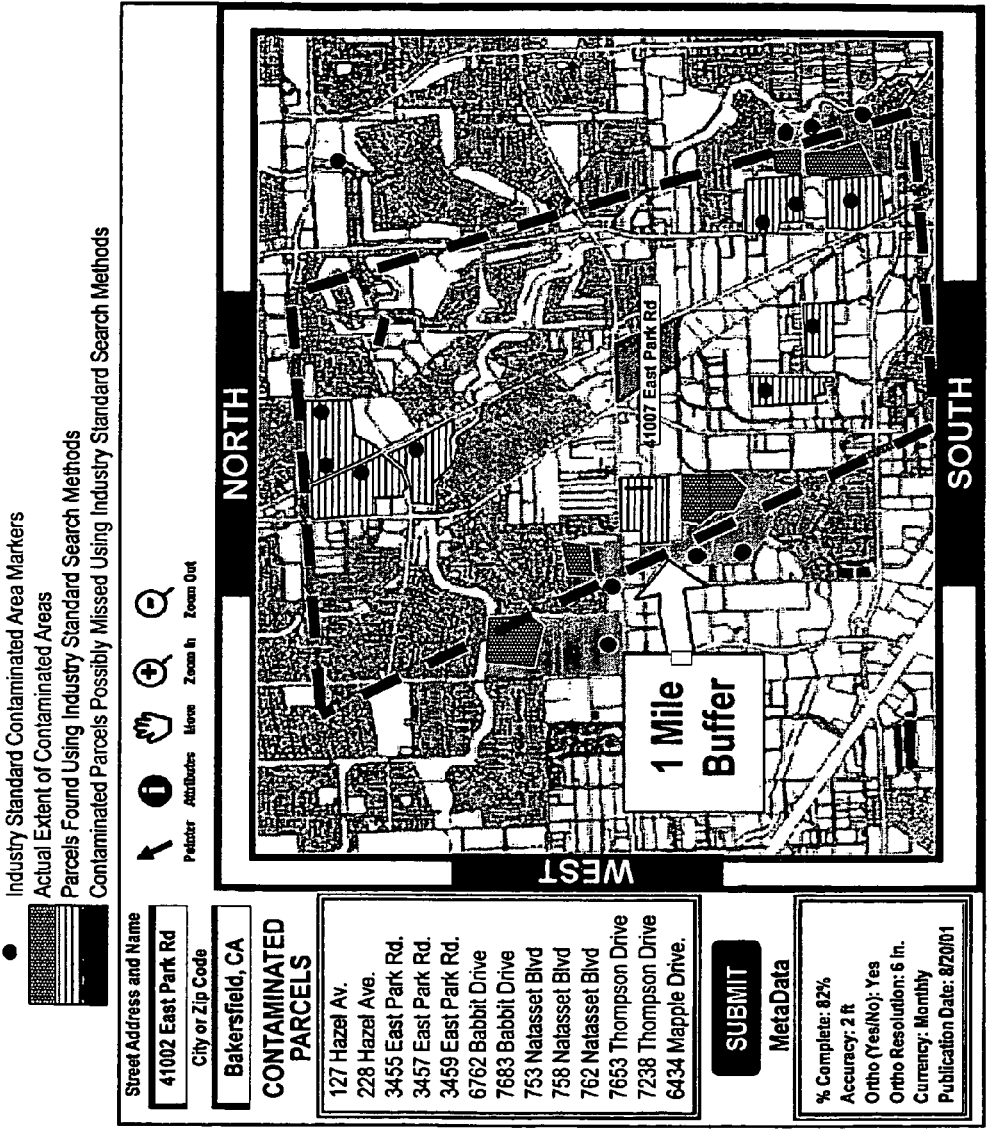

NPDP Business Relationships

COMPUTERIZED NATIONAL ONLINE PARCEL-LEVEL MAP DATA PORTAL

CROSS REFERENCE TO RELATED CASES

This continuation application claims priority to U.S. application Ser. No. 13/295,274, filed Nov. 14, 2011, which application in turn claims priority to U.S. application Ser. No. 13/065,023, filed Mar. 11, 2011, now U.S. Pat. No. 8,065,352, that application claiming priority to U.S. Divisional application Ser. No. 12/380,690, filed Mar. 2, 2009, now U.S. Pat. No. 7,912,880, which in turn claims priority to U.S. application Ser. No. 11/493,301 filed Jul. 26, 2006, now U.S. Pat. No. 7,516,156, said application itself a divisional application of U.S. application Ser. No. 10/347,102, entitled Computerized National Online Parcel-Level Map Data Portal, filed Jan. 17, 2003, which application issued as U.S. Pat. No. 7,092,957, on Aug. 15, 2006 that application in turn claiming priority to U.S. Provisional Patent Application Ser. No. 60/353,656, filed Jan. 18, 2002.

BACKGROUND OF INVENTION

Up until now, GIS (Geographic Information System) basemaps have been based on a national street centerline map originally produced by the federal government in the '70s. Today, there is a need for the additional detail, accuracy and currency possible only from parcel-level map data. Though hundreds of local governments have finished digitizing their parcel maps, a single national parcel map source (portal) does not exist. The National Online Parcel-Level Map Data Portal (NPDP) remedies this problem by providing the first national repository of parcel data for use by all industry sectors. Potential NPDP subscribers include title companies, property insurance companies, major land developers, retail, hotel, and restaurant chains, utility engineers, environmental consultants, government agencies such as FEMA, and a wide variety of location based service subscribers desiring the greater accuracy, detail and currency of parcel-level map data.

SUMMARY OF THE INVENTION

To build the NPDP, a parcel-level digital database of urban jurisdictions must first be assembled. More than 70% of the major American metropolitan areas have so far completed digital parcel-level map databases, and are willing to share them with industry. Under a wide range of terms and conditions, this data can be acquired and loaded into a centralized server system consisting of one or more server computers, the data normalized to a standard format.

In the data collection phase, each local agency is asked to provide a standard release to allow the use of their spatial data. As needed, negotiations can be conducted to assure the unconstrained use of such data on the NPDP server system. An outreach program can be maintained by the NPDP to encourage release of spatial-level data by sponsoring agencies and to add this data to the NPDP as it becomes available. As required, individual property assessor's offices of local governments can be paid data update fees in return for electronic copies of all changes to their agency's electronic parcel map database.

The collected GIS content added to the NPDP graphic database is an assemblage of current vector-based parcel map data stored in an online GIS format in which parcel boundaries and geocodes are linked to a non-graphic database of property tax records.

An end user, utilizing an assigned password, begins the NPDP process by logging on from a computer terminal to an intranet or internet start page of the NPDP, and enters the state, city, street and number of a desired address. The NPDP address database is searched for a matching tax record. If there is a match, the NPDP displays the road right-of-ways, all parcel boundaries within a select distance, the "exact" address location highlighted, the pertinent parcel polygon changing the color to a brighter or different color from surrounding parcels also displayed. In addition, a list of property record attributes such as owner, use code, assessed value and year constructed can be displayed for the selected parcel. Other displayed parcels can also be selected and their linked attributes viewed.

The NPDP can be customized by service subscribers of the NPDP for their own subscribers/users to perform a variety of spatial analysis/reporting functions.

BRIEF DESCRIPTION OF THE DRAWINGS

FIGS. 7A-7D are exemplary screen displays of custom NPDP functions.

DETAILED DESCRIPTION OF THE INVENTION

Figure 8:
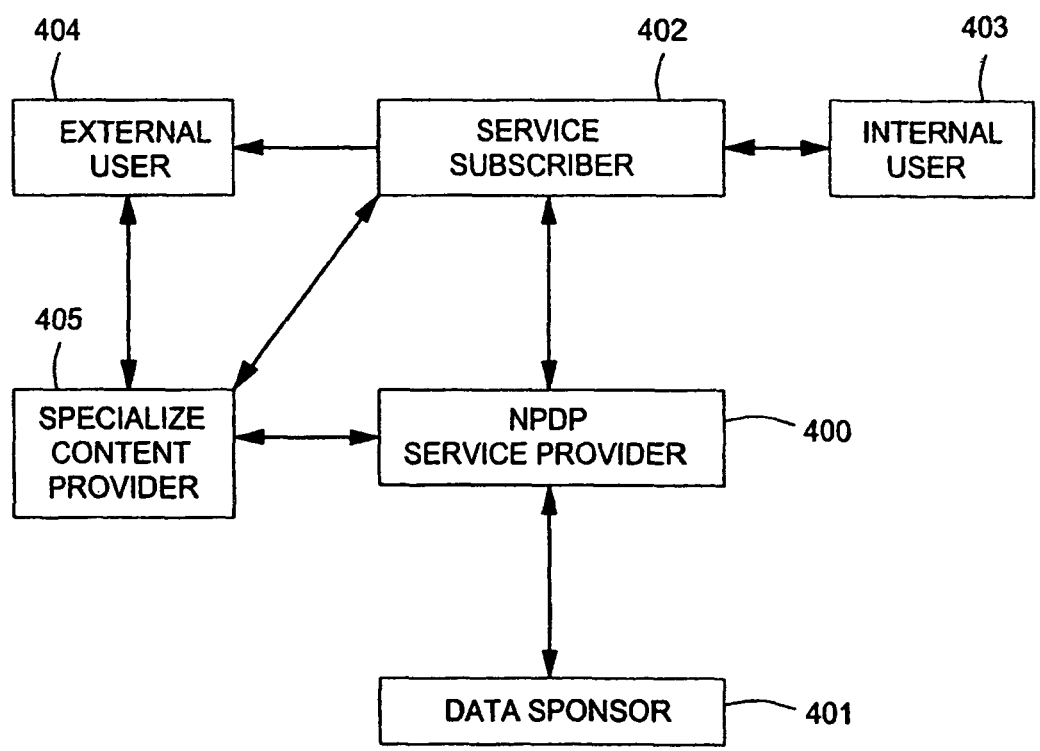
FIG. 8 depicts the inter-relationships of the various parties utilizing the NPDP.

The following definition of terms will be used throughout in the discussion of the invention, but should not be considered limiting thereof. Reference is made to FIG. 8 in connection with these definitions to better illustrate the interrelationships between the various parties.

NPDP: National Online Parcel-Level Map Data Portal, an internet warehouse that optimizes online delivery of parcel-level maps and linked attribute data.

NPDP Service Provider (400): The entity that establishes and maintains the NPDP internet warehouse, collects data, updates the databases, enters into arrangements with data sponsors, and service subscribers, and develops specialized applications for service subscribers.

Data Sponsor (401): A local governmental entity, be it at the city, county or other geopolitical level which provides electronic parcel maps for use with the NPDP, as well as private entities who are sources of specialized spatial data and/or maintainers of private databases.

Service Subscriber (402): That entity which links to the NPDP internet warehouse. having subscribed to the service made available by the NPDP service provider. The service subscriber may provide access to the NPDP to its in-house staff and to third parties which may separately subscribe to the services offered. In addition, the service subscriber may develop it own customized data services (with or without the assistance of the NPDP service provider) to apply the NPDP database to its special needs.

User (alternatively, End User): The service subscriber's internal users (403) who from a computer terminal visit the service subscriber's provided intranet site, or its external users (404) who electronically access the NPDP over the internet. These end users may access for free, for a subscription fee, or on a per transaction basis depending upon the modality of access, and the program and features being made available by the service subscriber. End users may also access the NPDP directly as individual subscribers.

Specialized Content Provider (405): A third party provider of layers of information used to supplement geographic information. Through various business arrangements, companies and organizations that specialize in providing these specific data layers on CDs and online enable end-users to view and/or attain the parcel layer from the NPDP server on-the-fly and/or by downloads and CDs.

The data structures within the NPDP follow common industry standard spatial data specifications as described below relative to the discussion of the basic data structure. The overall operation of the national parcel-level map data portal consists of two different components. The first, NPDP warehousing, is the gathering and storing of parcel-level map data from multiple sources formatted to a single protocol suitable for online access and use. The second is the creation of NPDP application programming interfaces (API), a set of basic and custom spatial transactions performed by NPDP service subscribers to support their work processes.

Basic Data Structure

Parcel-level GIS is a mature technology. Industry standards have emerged over the years until an almost universal spatial data structure for property ownership maps has evolved. According to this spatial data structure, the end points of each segment of a parcel boundary segment are assigned identical XY coordinates as the end points of other boundary segments that start or stop at each of its end points. As a result, there are no gaps or overshoots, thus defining each parcel by an area surrounded by a "closed" polygon made up of such boundary segments. Each segment is encoded with its parcel's unique identification number, commonly known as the Assessor's Parcel Number (APN). A parcel boundary segment that is common to two parcels is assigned two APN's, one for the parcel to the right of the line segment (relative to its direction from its start point to its end point) and one for the parcel to the left of the line segment.

The geocode value of the boundaries of the parcel's polygon is assigned the same Assessor's Parcel Number (APN) as the number assigned to the parcel in the indexing field of the Assessor's supporting tax record system. The parcel's tax record contains data based on the assessors' rolls. The data is assembled in tables where the columns represent fields such as owner; year built; assessed value; etc, the rows containing the individual parcel data records, arranged by field. This non graphic database is associated, parcel by parcel, with the graphic database, stored in the form of a single DBMS file, the records either generated by public providers or by commercial sector sources.

This configuration of graphic boundary segments and textural attribute assignments makes automated search of a digital spatial database possible. When a tax record with matching address values is found, the APN in the attribute table's index field is used to access the graphic database (all the parcel boundary segments) to find all boundary segments with this matching geocode. The XY coordinates of the vertexes of these boundary segments are used to find all other boundaries within a prescribed search radius of the matching parcel polygon. All these boundary segments are then displayed on the computer screen to form the parcel-level map. By placing the cursor in another parcel polygon, a spatial analysis function (point-in-polygon) determines the set of boundaries in which it is located and its APN geocode. This value, in turn, is used to access the tax record database, find the record with the matching APN number in its index field and display the attributes contained in this record on the computer screen.

NPDP Warehousing

The digital assemblage of parcel-level databases from all the sponsoring agencies is stored in a server system according to a standard protocol. The process begins with the acquiring of the raw parcel-level data from various data sponsors. In most instances, the desired data is usually limited to the agency's parcel boundaries and "geocode". This geocode makes it possible to associate a parcel's tax record (a flat text string within a data table) to the parcel boundary as an extended set of parcel attributes. All spatial data files are stored in a single location according to a single indexing scheme where:
- parcel and street overlays are given the same theme name
- indexing fields link the boundary to an attribute record given attribute name
- all features are given the same color, line font and naming conventions
- street annotations are provided in theme size and orientation of text
- view names are given a consistent naming convention.

Each incoming file is processed as needed to adopt it according to this protocol. Those files that require a prohibitive level of processing are set aside, their sponsors notified of the shortcoming and encouraged to modify their procedures so that the resulting data files can be made compatible with NPDP protocols.

NPDP Operations

In one embodiment, with license from the NPDP service provider, the service subscriber is assigned a number of passwords that enables users designated by the subscriber to perform both basic functions (as next described) and custom functions. The service subscriber can in turn establish a site for internal use by its employees/member companies (internal end users). In another embodiment, the service subscriber can by way of the internet make the NPDP available to third party subscribers (external end users) as a functionality to be included as part of a general subscription fee, as a special feature requiring additional fee, on an "as used" basis or some combination of these revenue generating options.

Basic Functions

In an embodiment of the invention, as part of the basic function, an end user seeking only a subset of parcel-level data, enters a street address including the city, state, street name and/or the number of the desired parcel into a window displayed on a computer screen. According to the state entered, a folder is electronically accessed containing all spatial data files for that state including supporting tax record databases for each agency for which there is stored spatial data.

If there is an address match, the pertinent parcel displays as a highlighted polygon in the center of the screen along with surrounding parcels. In addition, the parcel's linked tax record is displayed. Also, a metadata record describing the quality of the data set can be displayed to inform the subscriber of the relative quality of the data. The subscriber can pan and zoom and/or select other visible parcels to view their linked tax records. Alternatively, subscribers can use the cursor to select groups of parcels and see tax records in a tabular report.

If data is available for the desired jurisdiction but there is no address match, the subscriber is notified with a message, such as "No address match found." The user may be further prompted: "Would you like to view all parcels in Zip Code?" If the user answers no, the transaction ends. If the user answers yes, all parcels in the pertinent zip code area are displayed. The user can then zoom up to view the specific area of interest and determine the parcel of interest and by using a cursor select various parcels to view linked tax records. If there is no data available, the user can be notified that "no data is found".

Custom Functions

In another embodiment, additional, custom functions can be provided. These functions are determined according to the needs and objectives of the various service subscribers. Each is tailored to the service subscriber's specific operational requirements as negotiated under a "setup" fee paid to the NPDP service provider as compensation for both unconstrained access to all NPDP data and the development and maintenance of the subscriber's specialized online GIS application requirements.

Applications uniquely supported by NPDP for different industry segments are varied. For example, for online locators, more accurate address locations are enabled. Yahoo & AOL's MapQuest, Switchboard.com (Online telephone book) and Maporama.com operations can benefit by the vastly improved locational accuracy possible from the use of parcel-level data compared to street centerlines. Such subscribers would not require access to tax records since their end users' only interest is in seeing the parcel boundaries to more precisely determine the exact location of an address. Thus in the case of AOL type service subscribers, the "custom" function is actually a stripped down version of the "basic" function, i.e. only the parcel boundaries display. Linked attribute data does not.

Supported custom functions utilizing the NPDP can include title company flood disclosure determinations. A polygon-in-polygon application can streamline such flood insurance disclosure determinations, as for example whether or not a parcel is in the flood zone by determining if its boundary is in or crosses a flood zone boundary polygon. An address list of all addresses for which flood insurance determination is desired is used to retrieve the corresponding parcel boundaries and spatially compared to the pertinent flood zone polygons to see if it is in, partially in, near or not in the flood zone. The resulting finding is written as a value(s) to an automatically generated flood determination report. An image of each resulting screen display is captured and archived in a storage directory for future reference as needed to verify the above machine generated flood determination.

The polygon-in-polygon approach of the NPDP can also be used to streamline home and business insurance premium rating determinations. Lists of addresses of every home and business insurance policy holder within a jurisdiction can be used to retrieve each of the corresponding parcel boundary polygons. Each of the retrieved polygons is spatially compared with multiple layers of spatially distributed risk conditions from which insurance ratings are established. Such boundary layers can define fire, fault, flood, tidal wave, subsidence, mold and other risk zones for homes and businesses. Determinations whether a parcel boundary is in, partially in, near or not in any category of such zones is written to a database record subsequently used to generate rating values that contributes to the establishing of the price and other terms of an insurance policy.

Utilities can also benefit from having access to NPDP type parcel maps with displayed attribute data for utility network modeling. Specialized applications can include (a) backdrop maps which can be used to expedite utility network mapping, (b) network demand-generation maps in which attribute values such as land use codes, assessed value and year-built of parcels served by a network device are assigned to that device to calculate service demand values that drive network simulation (design optimization) models, and (c) gas line notification in which a buffer around a gas pipeline generates a parcel owner listing used to satisfy required annual notifications of adjacent land owners.

The NPDP database can be used by telecommunications companies to optimize telecom facility site selections. For example, multivariable queries of attributes assigned to all parcels in the vicinity of a new tower site (determined by facility optimization application of the service subscriber) can be used to identify the parcel in which the optimal tower location falls. Owner's phone numbers assigned to each parcel can be used to automatically contact pertinent property owners. Where the number of stories of buildings is included in the assigned parcel attribute list, and thus used to generate height constraints, line-of-site assessments can also easily be conducted.

Figure 7A:
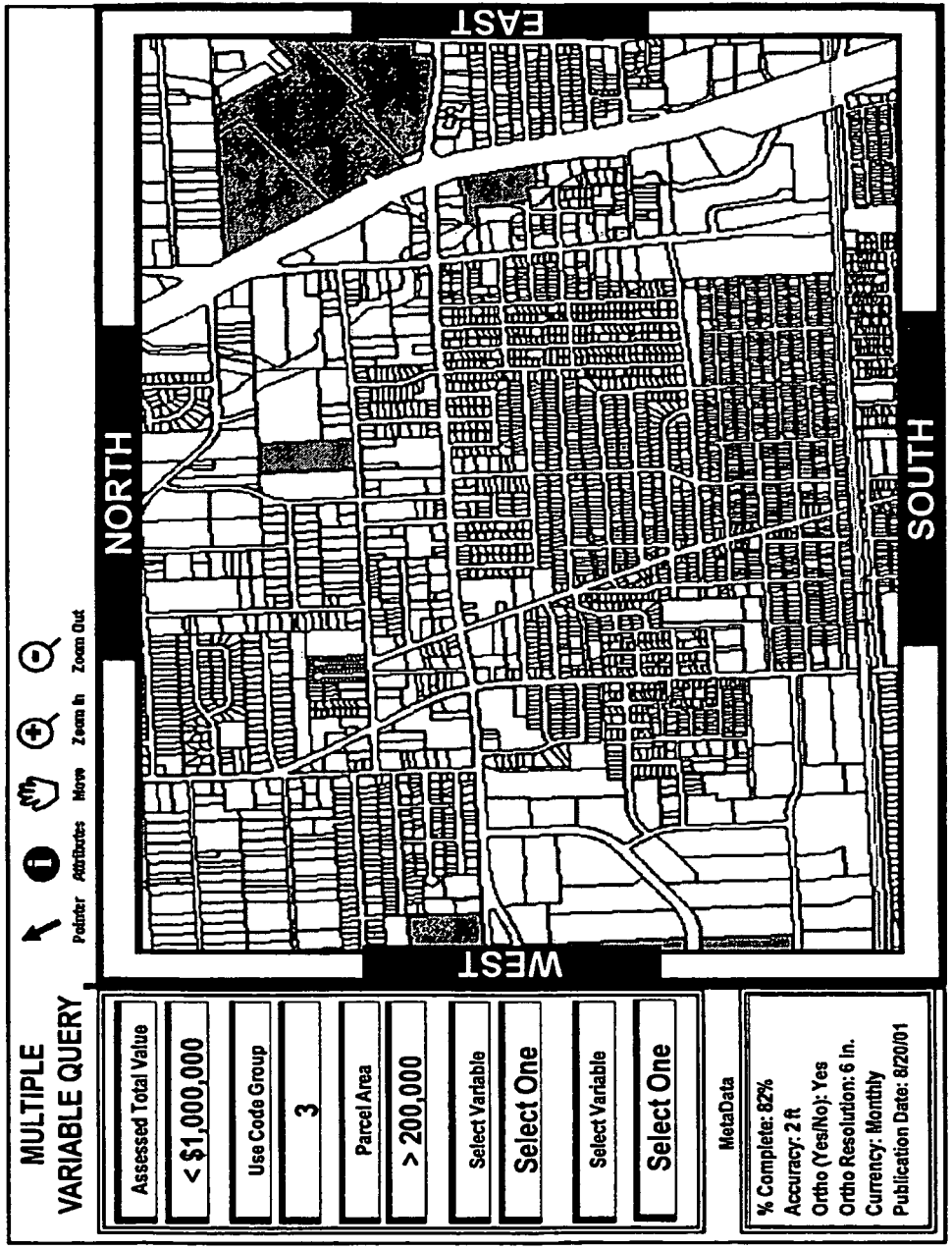

In yet another potential NPDP application, state, federal and local environmental assessments and compliance can be expedited. For example, by using the polygon-in-polygon function, intersecting parcel boundaries with pollution plumes and hazard zones can easily be determined, thus streamlining environmental impact analysis and notification. With reference to FIG. 7D, hazardous waste locations currently displayed as a "dot" (point) are displayed by the NPDP as a highlighted parcel instead to improve impact assessment accuracy. Finally, a buffer of prescribed distance from the parcel's boundary can be intersected with boundaries of all surrounding parcels. Addresses of all contaminated parcels within or touching the buffer can then be written to a report that includes APN numbers, nearest distance from subject parcel, hazardous waste conditions present, history and remedial action.

Figure 7B:
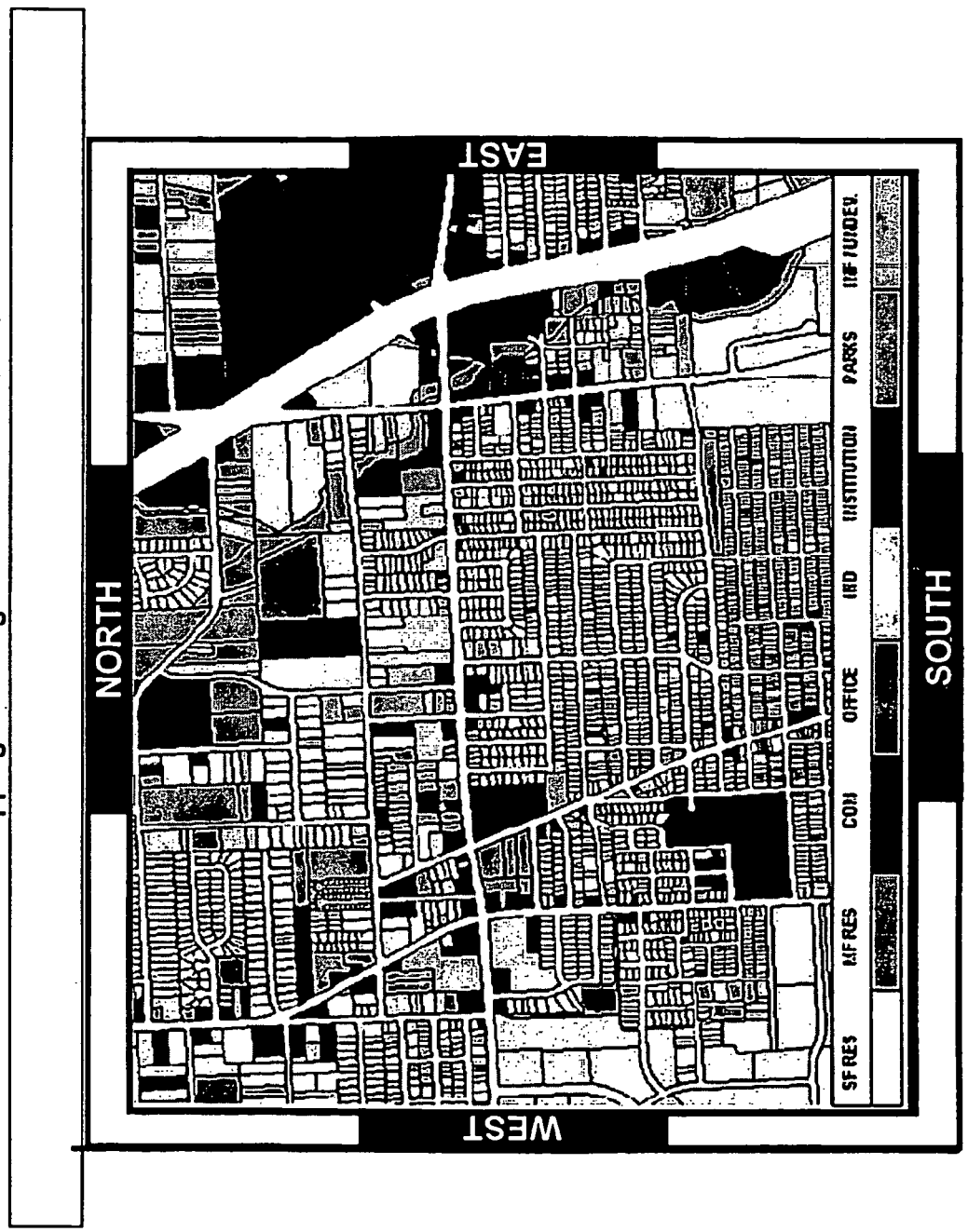
Figure 7C:
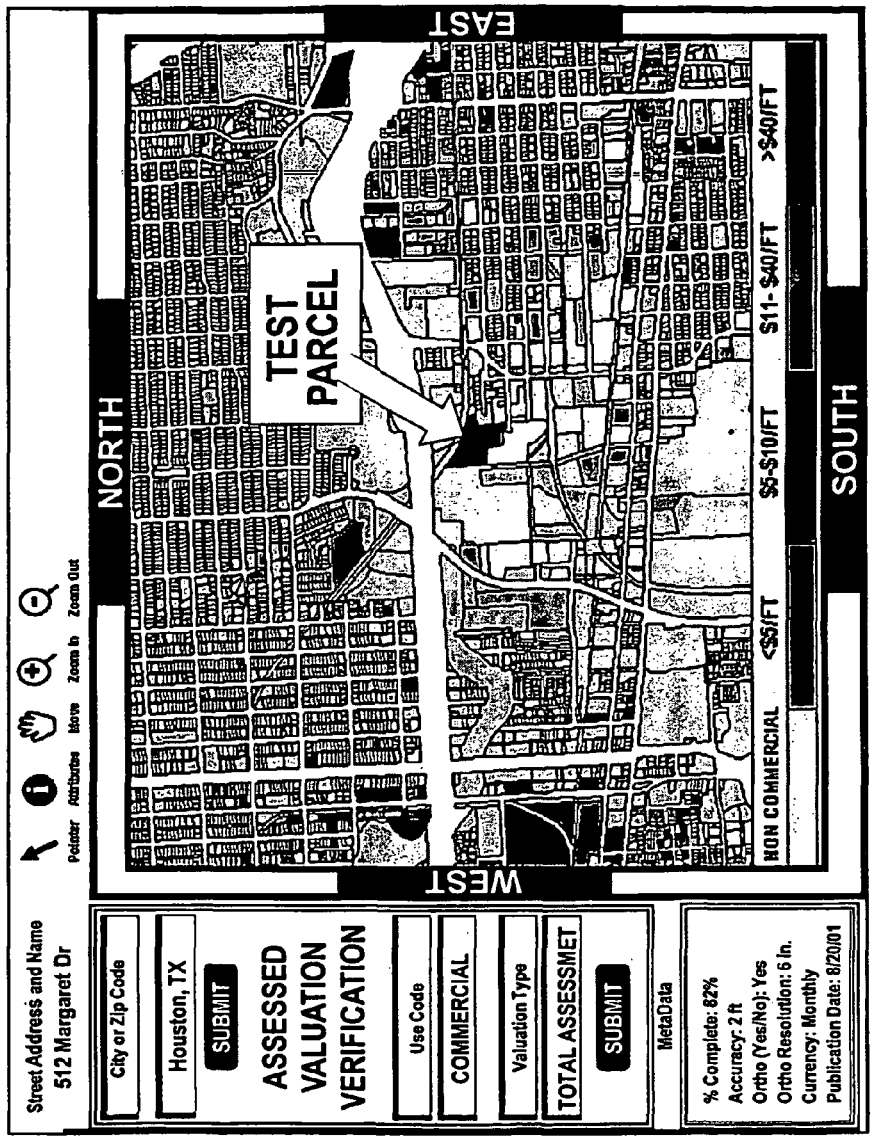

Still other specialized applications are possible. Without intending to be limited, it is further noted that the NPDP can help retail, restaurant, and hotel chains with numerous locations in major markets greatly enhance existing in-house cross-regional facility location applications in the following ways: (1) Alternative Site Selection. All parcels in the vicinity, neighborhood, community, or region for which a new facility is to be sited are subjected to a complex query of their assigned attributes to highlight all parcels with compliant zoning that are big enough and cheap enough to be an alternative candidate site for further consideration (See FIG. 7A). (2) Site Compatibility Assessment. Thematic maps of assessors' valuations, year built and use codes generated of surrounding areas so candidate sites can be evaluated for relative compatibility compared to the other surrounding parcels (See FIG. 7B). (3) Over-Assessment Testing. A thematic map displaying total assessed value per square foot of improved area of surrounding parcels with the identical use code of the subject parcel are compared to the that assigned to the subject parcel to see if its total assessed value is generally greater, the same or less than that of all nearby parcels of the same use code assignment (See FIG. 7C).

DETAILED DESCRIPTION OF SPECIFIC METHODOLOGIES

Figure 1:
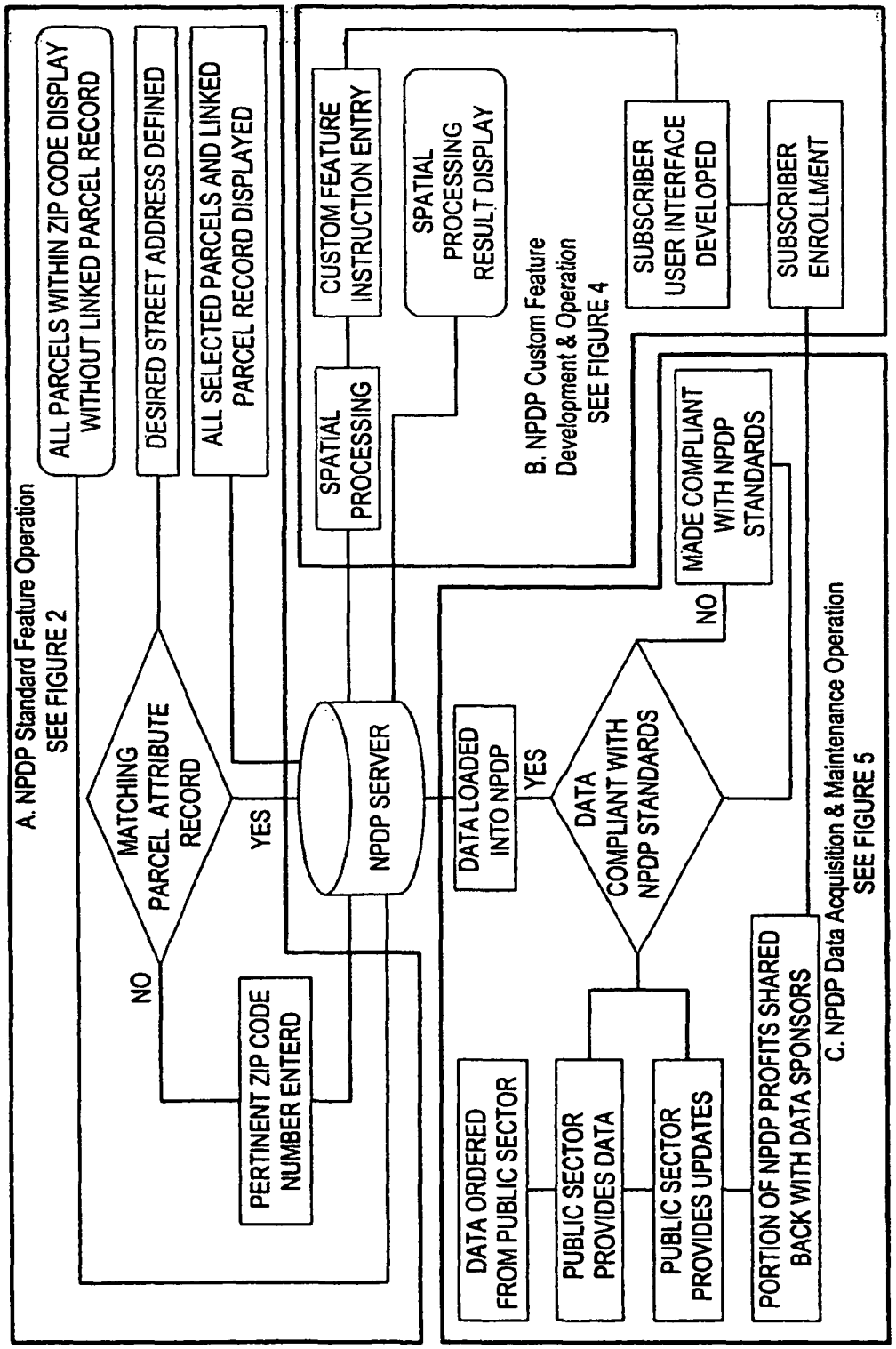
FIG. 1 is a flow diagram showing actions required to establish and maintain the NPDP.

FIG. 1 provides an overview of the NPDP Development and Operations Program. The overall effort to establish and maintain the NPDP is broken up into three program development and maintenance components: (A) NPDP Standard Feature Operations, (B) NPDP Custom Feature Development & Operations, and (C) NPDP Data Acquisition and Maintenance Operations. Each of these operations will now be described with reference to FIGS. 2 to 5.

NPDP Standard Feature Operations

Figure 2:
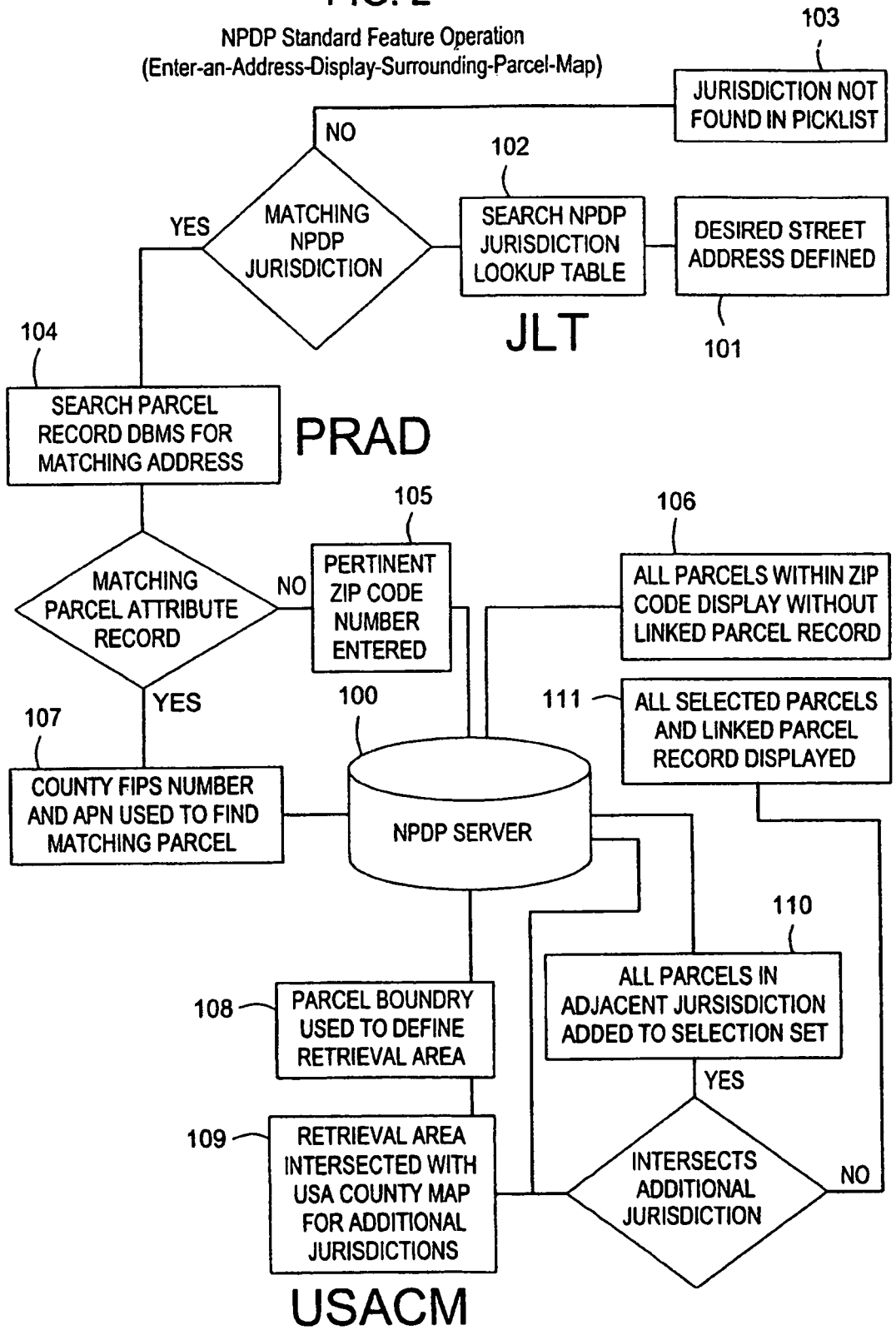
FIG. 2 is a more detailed description of the NPDP standard feature operation.
Figure 6:
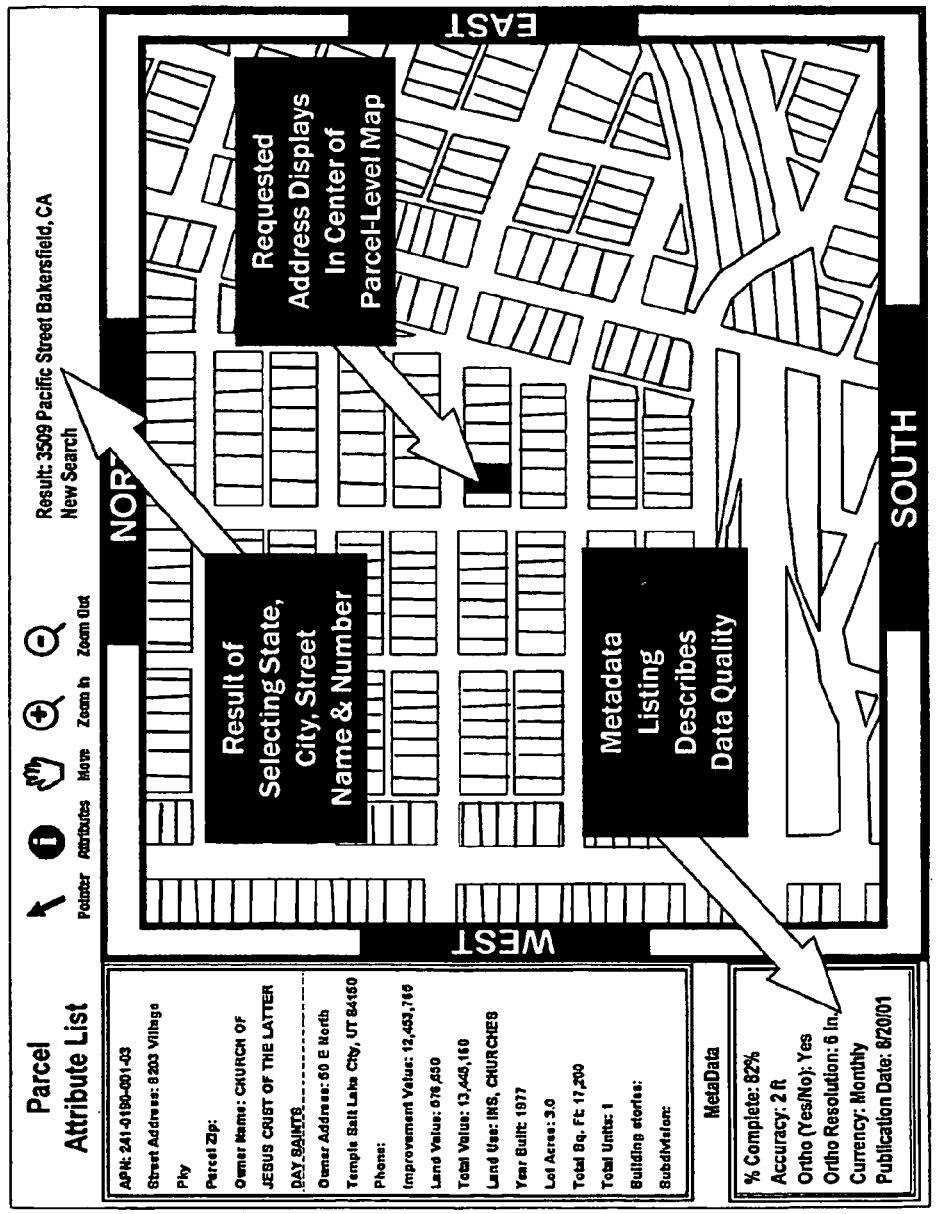
FIG. 6 is a screen display of a standard NPDP address match feature.

FIG. 2 provides a detailed explanation of the individual computerized steps involved for the NPDP to automatically perform its standard feature operation of retrieving a requested map area around a parcel based on an entered street address. The basic components of the NPDP standard feature operations are shown shaded in FIG. 2. FIG. 6 is a screen shot of a sample result of an address match.

The National Parcel-Level Map Data Portal Server (NPDP SERVER) 100 is constructed on an industry standard internet server platform. As noted before, the center of the NPDP design is the placing of each jurisdictional database (county, city, town, township, administrative unit, place name, etc.) into an individual directory assigned a name equal to the FIPS number (Federal Information Processing Standards—protocol used nationally to numerically identify specific county jurisdictions) of the county for which the database pertains.

The data format of these files, even if delivered in the same GIS database format, may vary widely from sponsoring jurisdiction to sponsoring jurisdiction. The following steps are applied to each original jurisdiction graphic database as well as to each of the subsequent update files to "normalize" all maps into a single universal spatial protocol by applying the following procedures:

- The SHP files that make up the parcel overlay are given the same theme name.
- The SHP files that make up the street centerline are given the same theme name.
- The view is named according to a standard naming convention.
- The field that contains the assessors parcel number (unique ID number) suitable for linking the graphic database to the non-graphic database (described next) is given the same name.
- The spatial data making up the parcel and roads theme are re-projected to a common universal national projection.
- All polygons and linear features in all themes are assigned common colors.
- Street right-of-ways are annotated with street names according to a common placement, scale and naming standard.

Each jurisdictional directory at a minimum contains a graphic database derived from public sector sources. Typically this is a countywide parcel map (parcel polygons geocoded with APNs) provided by a single taxing authority, and provided in SHP-ESRI ArcView native spatial data file format. Most often, this file will contain a polygon for every parcel in the county. In some cases, the file may not be complete. Alternatively, it may be a single SHP file that is a composite of multiple (but not necessarily all) jurisdictions within the county.

As an eventual alternative to the SHP file format, an open GIS Consortium OGC compliant format is emerging. The OGC is an international industry consortium of more than 220 companies, government agencies and universities participating in a consensus process to develop geo processing specifications. Though the SHP format is not yet useable with all GeoBrowser platforms, this disadvantage is offset by its near universal use by public sector data sponsors. At such time that SHP file formats are migrated to the OGC standard, it is expected they most likely will be migrated to a commercial spatial data engine as well.

Regardless of file format applied, the design of NPDP SERVER 100 must accommodate easy updating of both the graphic database and the non-graphic database since a central value of the NPDP is its currency.

The Parcel Record Attribute Database (PRAD) 104 serves as the above non-graphic database. This "flat" tabular parcel attribute (tax and building) data record set is provided by the country or a commercial supplier. The index field is the assessors parcel number (APN) also referred to as the parcel identification number or PIN. These indexing values are equal to the value assigned as the unique ID to each parcel boundary in each SHP file that makes up the NPDP graphic database. Linking of the records with the parcel polygons is accomplished using standard software resources of a selected geographic data browser (GeoBrowser), such as for example ArcIMS®.

The Jurisdiction Lookup Table (JLT) 102 is a single tabular file, developed and maintained by NPDP service provider. The JLT makes it possible for the state and jurisdiction values stated in an address entry transaction to be used to determine the pertinent county in which it is located. Hence, by the table also containing the county's FIPS number, the appropriate county directory is automatically accessed for data retrieval purposes. In addition, the JLT is the source of the Metadata values assigned to the parcel map data of each jurisdiction within a county. Each JLT record contains the following fields: state, jurisdiction, county name, county FIPS number, accuracy, publication date, percent complete, ortho scale, ortho resolution, and update frequency.

In such cases that a single SHP file from a single data sponsor is the source of all data in a county, the metadata values for this single file is repeated in every JLT record pertaining to each jurisdiction in the county for which there is data coverage. Also, in such cases that a county provided parcel map is not complete, jurisdictions for which there is no data coverage are not listed in the JLT. By not finding a match, the end user is presented a message that there is no data available.

Figure 3:
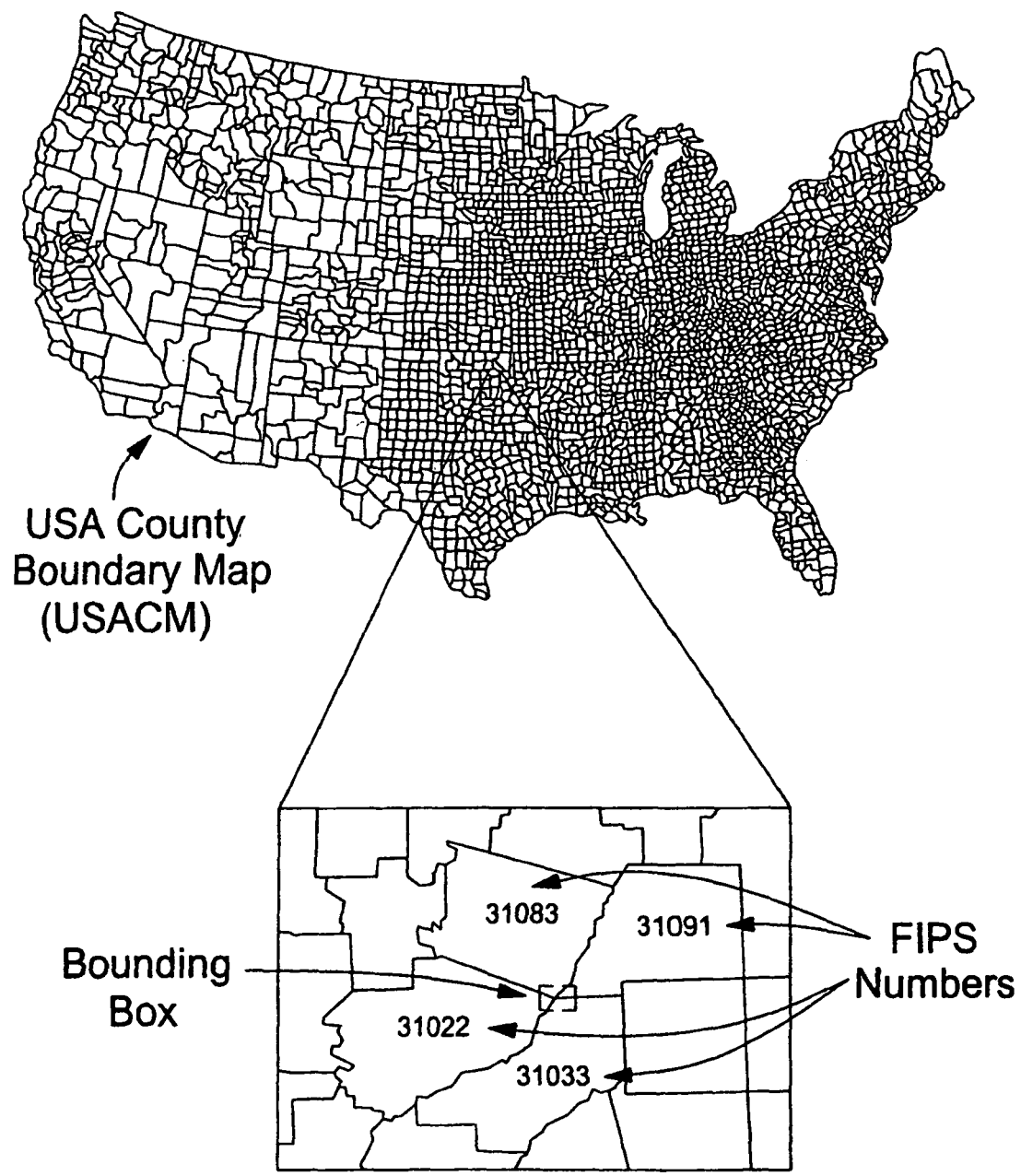
FIG. 3 is a USA county map used as spatial index for retrieving GIS map data from multiple counties.

FIG. 3 illustrates a USA County Boundary Map (USACM). This is a public domain boundary file of each and every of the 3140 counties within the United States. Each of these polygons is geocoded with its county name and FIPS number, a numerical jurisdictional identifier, as illustrated in the figure.

There also commercially exists a National street centerline file, each street segment of which is geocoded with its street name (no address ranges). This file can be used as a keymap reference for those areas for which parcel-level data has not yet been added to the NPDP. The background color of each county polygon in the USACM for which there is parcel-level data available is the same color as the street centerlines, making them appear "invisible" in these areas. Instead of street centerlines, the location and general width of streets, roads, highways and freeways are displayed as right-of-way areas of publicly owned land between the parcels' front lot lines. For example, if the map background was white, as in FIG. 6, then the street right-of-ways are the white areas between the parcels. In these same right-of-way areas, the name annotation value is displayed as a street name, in a different color than the centerline segments.

The end user first enters the street address number, street name, city name and state name into a provided data entry window, step 101. This same process can also be done using pick lists in which the user first selects a state and a jurisdiction from displayed pick lists. Given the user selected jurisdiction, a street pick-list display appears. The user then selects street name and street numbers from additional pick-list displays. Either way, the results of the search and associated parcels are displayed in step 111 (illustrated in FIG. 6).

The state and city name selected is used to query the NPDP Jurisdiction Lookup Table (JLT) 102 listing all jurisdictions by state, county and county FIPS number for which there is parcel data loaded into the NPDP. If there is a match, the county FIPS number is placed in a selection set (of one) for subsequent use as described in steps 109-111 below. If the desired jurisdiction is not in the JLT, the end user is so notified that the desired parcel data is not available, step 103. The user can then enter an address in another jurisdiction or ends the work session.

When the user selects a desired jurisdiction (city, township, town, administrative area or other place name), the FIPS number of the county in which the jurisdiction is located is retrieved from JLT 102. This FIPS number is used to access the NPDP county directory named by a matching FIPS number. The non-graphic database (Parcel Record Attribute Database—PRAD) located in this directory is searched in step 104 in the selected jurisdiction. If the desired street name is not found, a street known to be nearby may be selected. Alternatively, the user can opt in step 105 to retrieve all parcels in the pertinent zip code area. Upon selection of desired street name, PRAD is queried to identify all street address numbers assigned to the selected street name (within the selected jurisdiction).

As noted above, if the desired street name is not present in the NPDP, as an option to address-match parcel-map retrieval, all parcels within the zip code area in which the desired parcel is located can be retrieved. To do this, the zip code of the desired area is entered. To aid zip code determination of a desired area, a hyperlink can be provided to the US Postal Service Zip Code Locator web site (or comparable web resource). The PRAD is queried to create a selection set of all records containing the entered zip code. In step 106, a list of APN numbers is passed to the resident SHP file to retrieve and display all parcel boundaries within the desired zip code. Since there is no matching address, there will be no linked parcel attributes for the searched address to be displayed. However, linked parcel attributes will be displayed upon cursor selection of any of the displayed parcels. A national street centerline overlay is also installed on the server, adjusted to map projected standard and used as a key map where no parcel data is available and can be used as an alternate display, as well as a source of street names for those areas that are available.

If there is an address match (per step 104), the county FIPS retrieved earlier from the JLT (step 102) is used in step 107 to access the pertinent county directory. The APN number retrieved from the pertinent PRAD listing is used to select the desired parcel polygon within the pertinent SHP file.

In step 108, the selected parcel boundary is offset according to a defined (DEFAULT) distance—the user interface console may include a parameter entry box to facilitate user modification of the DEFAULT offset value. The result is the generation of four coordinates that define a rectilinear parcel retrieval area referred to as the "bounding box". Boundaries of all parcels within or crossing the bounding box are retrieved from the pertinent county's SHP file and written to a selection set.

To see if there is parcel data present within the bounding box that is located in an adjacent county, in step 109 the bounding box is intersected with the county boundaries in a USA County Boundary Map (USACM) to generate a list of FIPS number of all such counties. See FIG. 3 for an illustration depicting a bounding box interesting multiple counties, each of which is assigned its own individual FIPS number. It is to be noted that same procedure applies each time the user changes the extent of the view area (pan, zoom). The resulting new bounding box coordinates, equal to the screen viewing extents, is intersected with the county boundaries to determine whether or not the required data needs to be extracted from a single or multiple county directories.

If there are county boundaries present that intersect the bounding box, the first value in the resulting FIPS number selection set in step 110 is used to select and access the pertinent county directory. If there is no directory present with a matching FIPS number, the next FIPS number in the selection set is likewise processed. If there is a directory present with a matching FIPS number, boundaries of all parcels within that directory and within the bounding box are retrieved and added to a FIPS number selection set. The process is repeated until all FIPS numbers found in 109 have been applied to this process.

All parcel boundaries in parcel selection set can now be displayed on the standard NPDP screen along with a listing of the parcel attribute record linked to the parcel with the desired address, step 111. A representative depiction of this screen is provided in FIG. 6. Also, the JPL is referenced and the metadata values assigned to the pertinent jurisdiction reported in a box provided for that purpose.

NPDP Custom Feature Development & Operations

Figure 4:
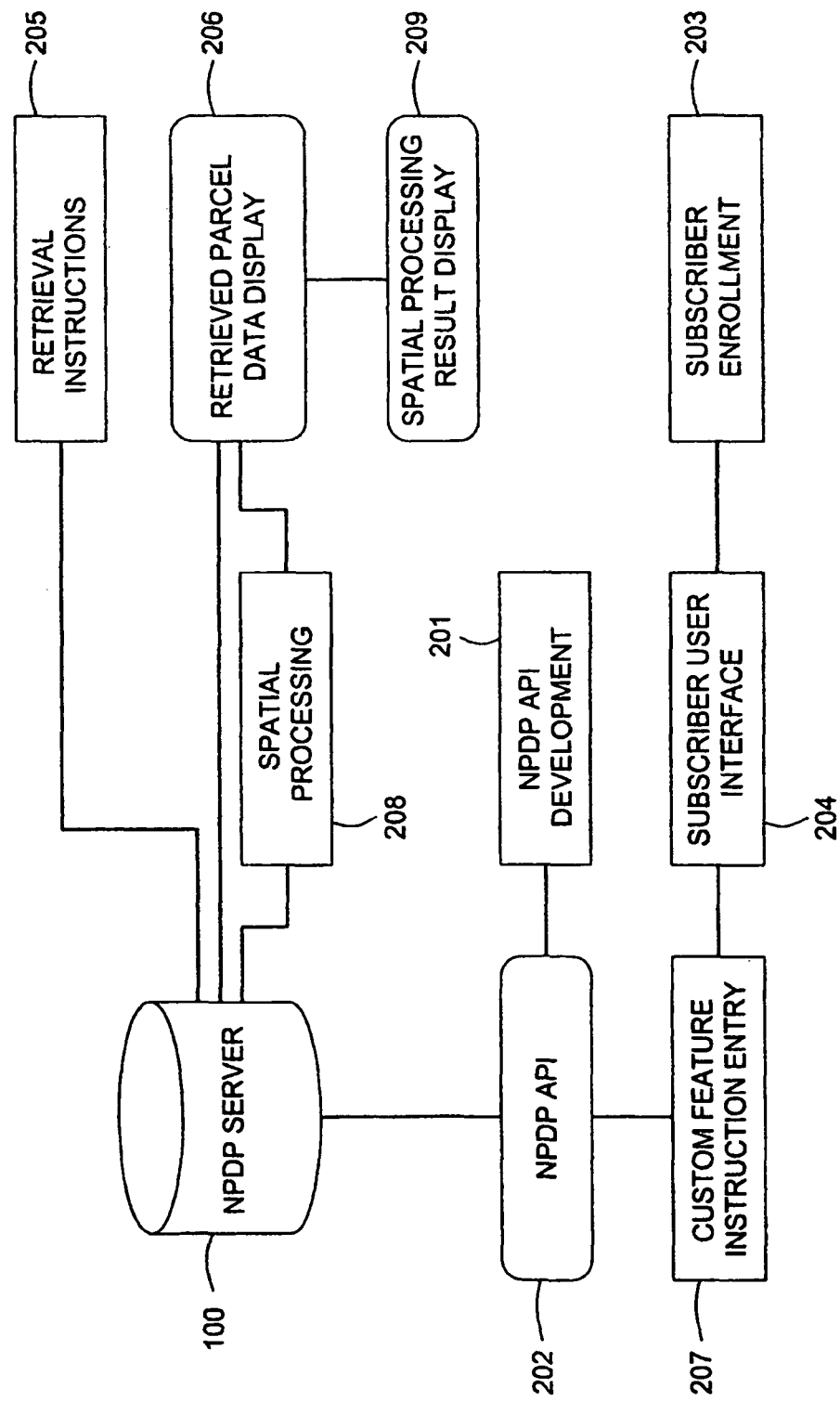
FIG. 4 depicts a custom application development program.

FIG. 2 illustrates the specific steps involved for the NPDP to perform its standard feature (Enter-an-Address-Retrieve-A-parcel-Map-And-Linked-Record). FIG. 4 is an explanation of the development and use of the NPDP application programming interface to expedite the provision of custom applications for end-users as part of specialized options that can be made available to NPDP subscribers.

Based on subscriber demands, in step 201 the NPDP Application Programming Interface (API) is developed, made up of a set of tools to expedite the rapid prototyping and finalization of custom subscriber features. Each spatial analysis/reporting tool can be ported to multiple GIS vender platforms including ArcIMS® by ESRI, MapGuide® by Autodesk, MAPEXTREME® by Mapinfo and GEOMEDIA® by Intergraph®.

Consisting of spatial transactions combined with external database interfaces, the NPDP API 202 can contain the functionality of the following basic tools including, but not be limited to: Query Mark, Complex Query Mark, Polygon/

Point/Line-in-Polygon, Feature in Buffer Reporting, Thematic Mapping, and Complex Thematic Mapping.

Concurrent with the NPDP API Development is the NPDP subscriber enrollment Program 203. The specific manner in which the new subscriber would like to use the data in the NPDP to increase work productivity and quality is identified as part of the establishment of the terms and conditions for an NPDP subscription.

Each subscriber (step 204) is provided as part of the "setup" fee a custom user interface composed of a set of menus and instruction entry screen features. This specialized user interface facilitates the completion of more analysis, reporting, interrogation and other spatial/tabular data processing transactions with greater accuracy and reliability. These "point-and-shoot" intuitive screen console features require minimal training. Each is subject to final subscriber acceptance. In addition, according the selected GeoBrowser platform, the NPDP API expedites the ability to self-modify and expand the NPDP interface, and develop proprietary tools. Alternatively, a subscriber may choose to have the NPDP content on their own server in addition to and/or instead of on the NPDP Server. These subscribers are provided an industry standard ftp download site so that the content can be written on demand by them to their server for local use or for use on their internet operations.

Prior to a subscriber being able to apply their custom NPDP user interface, the standard NPDP data retrieval feature is applied in step 205 to fill the screen with parcels map features, be it either an area around an address or an entire zip code area. Each parcel polygon feature is linked in step 206 to a parcel attribute listing derived from the linked PRAD. This parcel selection set can be modified by zooming and/or panning the displayed image. The resulting GIS-ready map features are subject to being acted on according the instructions passed into this spatial database as described in step 206.

In step 207, the subscriber selects a technique to be applied from a basic menu proprietary to their NPDP portal design. Incorporated in the API features descried in 202, these instructions are provided through a combination of user interface features including, but not limited to: buffer distance and increment specification entry, terms for reporting polygon/line/point-in-polygon intersection with other layers, query specification entry, thematic map regime color, increments, classification type, subject field, normalizing field specification entry, feature selection and reporting specifications, batch transaction loading specifications, and others. The instructions generated in step 207 are applied in step 208 to the basic spatial transaction tools of the NPDP API. To the extent possible, the selection set is composed of graphic features and attribute records "in memory", enabling instructions to be implemented without any subsequent need to access the NPDP server. The result, step 209, is a combination of spatial displays, tabulations and other text reports, displayed on the screen and/or written to independent file(s) either manually or automatically interfaced with other databases or reporting systems within the enterprise information system.

NPDP Data Acquisition and Maintenance Operations

Figure 5:
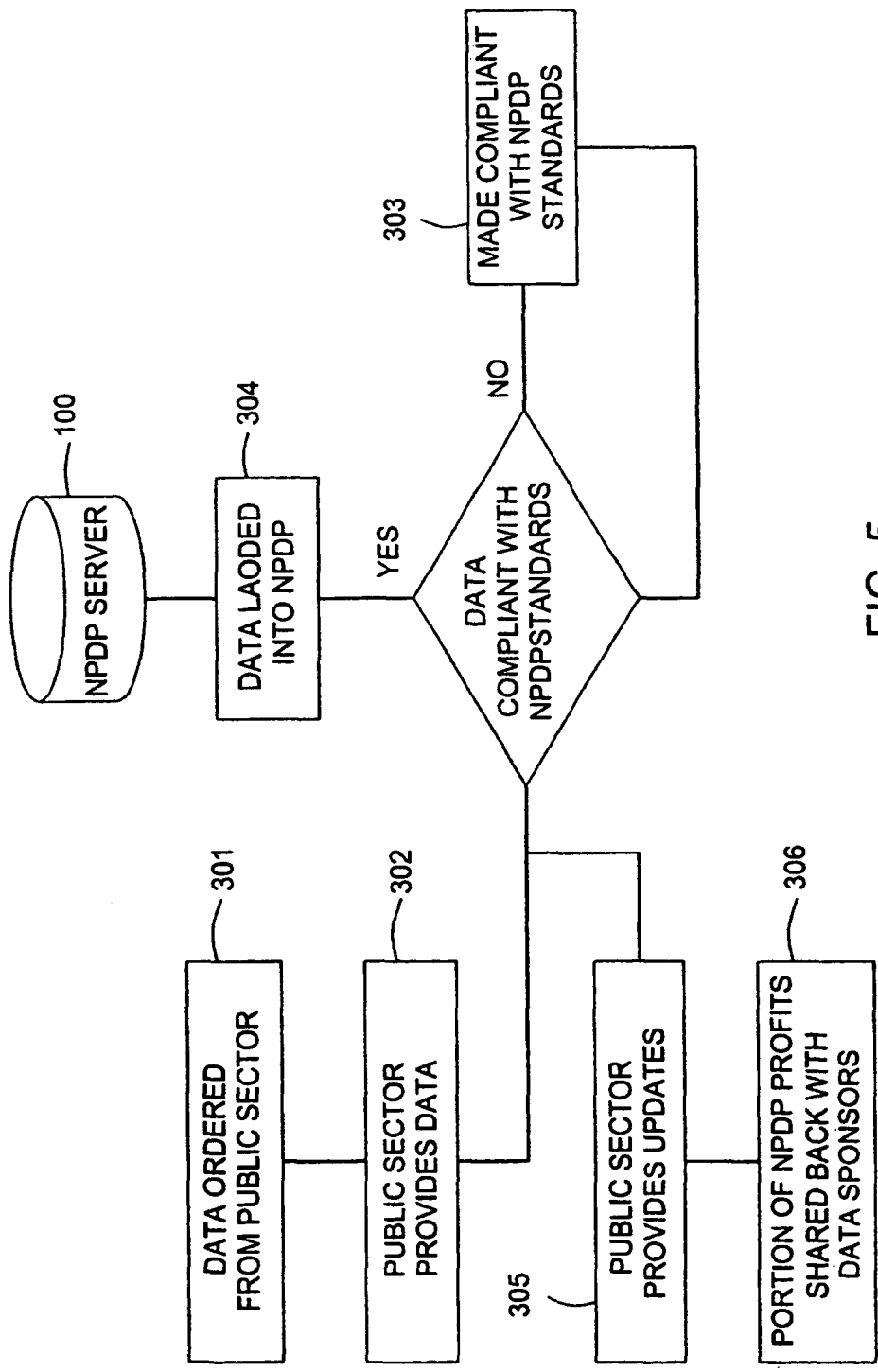
FIG. 5 depicts a NPDP data acquisition and maintenance program.

FIG. 5 is an illustration of the process for establishing ongoing data acquisition and maintenance operations needed to build, maintain and improve the public domain content of the NPDP, along with commercially supplied data sets and the national street centerline map as described above.

Data must first be obtained from the public sector, step 301. Through a sustained program, all property tax assessment agencies are contacted, and metadata profiles of parcel map GIS databases recorded along with terms and conditions for data acquisition. Each county is requested to submit in digital format a copy of their jurisdiction wide parcel boundary map, complete with tax number geocodes for each parcel. In the initial building of the NPDP database, those jurisdictions within major metros, that is with populations of 120,000 or greater are first contacted.

In step 302, each public sector data provider, i.e. the data sponsor, fulfills the data acquisition request according to their individual protocols. Once the data has been received, it is examined for compliance with NPDP standard protocols. Those agencies submitting data that is or can be made NPDP compliant within an acceptable band of effort are petitioned for release of the data for online reuse. This process ranges from attaining signed copy of a standard release form prepared by NPDP service provider, to signing an agency's standard license. As needed, tailored agreements are established to make agencies standard entitlements broad enough to encompass NPDP online operational requirements.

Some of the incoming graphic files are compliant with all NPDP standards as-is including projection, platform, graphic quality, geocode, attribute values, normalizing assessor's parcel number field, structure (single jurisdiction wide file), and other protocols. Other data sets must be modified, transformed, amended and/or converted as needed in step 303 to become NPDP compliant per the criteria discussed above. As the data is found or made compliant with NPDP specifications, it is loaded in step 304 onto the server in a directory that has the same FIPS number as the jurisdiction in which the NPDP data sponsor is located. To the extent possible, the NPDP is developed in a manner that expedites the ultimate self-updating of the spatial data by the sponsoring agency. This is possible once a data sponsor has consistently submitted data updates that as-is are NPDP compliant.

Unless otherwise constrained by a data sponsor's established data updating protocols, all jurisdictions are electronically updated, step 305, typically on a quarterly basis. Assuming all data arrives and is made useable within a three month period, as soon as the NPDP is fully loaded, each county file folder can be overwritten with the latest data set. Overall, steady state NPDP maintenance results in graphic and non-graphic data sets that are rarely over 90 days old. NPDP server design anticipateata sponsors will eventually self update their directory through the use of assigned ftp (File Transfer Protocol—a common method of moving files between two internet sites) parameters. This will lead to updates being as current as that sustained by the data providers "internal" operations, updates that are normally available only to other agency departments.

Alternatively, subscribers can attain updates in the form of "change layer" overlays in addition to or instead of the full data update layer. To produce the change layer, the most recently released parcel map overlay is spatially compared to the previous parcel map overlay. The following parcel polygons in the new parcel map are identified and copied to a new overlay containing only:

All parcel boundaries created due to splitting/subdividing an existing parcel.

All parcel boundaries that were modified due to a size and/or boundary adjustment.

All parcel boundaries created when two or more parcels are joined into a single parcel.

As an incentive to data sponsors to be prompt with data updates, individual public sector update fee schedules can be established, step 306. Additional, or "charter" funds, can be offered by the NDPD service provider, making it an active partner in expanding and improving the National Parcel-Level Map Data Portal through private sector sharing with the public sector a portion of the profits yielded by private sector value-added use of public sector data. The rate of the pay back can vary, and by way of example can be based on a prorated (agency's parcel count compared with all parcels in NPDP) share of NPDP's profits from NPDP operations.

As another or alternative inducement to obtain public agency cooperation, NPDP data sponsors can be offered use of the NPDP server as their primary online server resource. As confidence in the public-private alliance relationship matures between the NPDP provider and the NPDP data sponsors, it is anticipated, due to the superior speed, reliability and functionality of the NPDP server, data sponsors will come to depend on the use of NPDP server as their online server. By being able to abandon their own online server, substantial savings in ISP fees and staff time will flow to such data sponsors over and above that provided by the share-back program described above.

The Business Revenue Model

The business model begins with the establishment by the NPDP service provider of a publicized parcel-level map data web site with links to a tax record database. All market segments are served by a standard address match function to easily display the area of interest. There are two operational components, one being supply, keeping the NPDP current and competent and, the other being demand, delivering the NPDP data in informational configurations that are directly useful to the subscriber/end users information management operations. Description of how each is to be implemented follows.

NPDP Supply Operations

Data update costs are projected to be modest since the industry trend is toward cost of reproduction only, though some agencies insist on cost-recovery based annual subscription costs which in some cases can equal the initial acquisition fee. Once the NPDP is profitable, a portion of the profits can be "shared back" on a quarterly basis to all data sponsors (possibly in addition to update fees). By way of illustration, without intention to limit the options for sharing back with the data sponsors, the following equation is provided:

$$\text{Incentive Payment} = \frac{(\text{total profit}) \times (\text{data sponsor parcel count})}{(\text{total parcels in } NPDP \text{ data base})}$$

This share back program serves two purposes. First it provides fiscal resources to help counties fund efforts to improve the quality of spatial data. Second, is helps build rapport, and mutually supportive data sponsor—NPDP provider relations. These payments can be made quarterly or more frequently, contingent upon the data sponsor being current with required data updates.

The NPDP server keeps track of all transactions according to how many times users reference parcels within each data sponsor's DCM. As needed, and according to terms negotiated individually with each data sponsor, these transaction counts can alternatively be used as the basis of data update remuneration schedules (independent of the above incentive payments).

It should be understood that other payment arrangements can be made. For example, rather than profits, payments can be based on total NPDP provider revenue. In another embodiment payments can be linked to number of site hits at the local government level vs. total number of hits on the NPDP.

Initially updates are accommodated by the agency shipping the updated information in CD ROM format. However, as data sponsor sites mature and if, or when data quality is compliant with NPDP standards, data sponsors may use ftp protocols to self-update the NPDP server. Incentive for data sponsors is the higher revenue share that flows to them by reducing the NPDP service provider's operational costs.

Another public-private alliance option is to offer the free use of the NPDP server to such data sponsors in addition to or in lieu of their revenue share. This offers the added advantage of the NPDP being as current as the source agency's in-house content.

NPDP Demand Operations

Prior to and upon the NPDP server being operational, service subscribers are recruited, and terms of use determined according to a combination of possible pricing protocols, custom software user interface features and fee collection methods. A description of some of these various revenue models follow.

1. Annual Subscription Agreements. This is expected to be the dominant model. Each service subscriber pays a "setup" fee that is determined according such factors as the total number of parcels to which the subscriber is allowed to access (particularly those subscribers downloading the content to their server for local or internet use) and/or passwords assigned, total expected transactions over time, and scope of custom applications to be developed, provided and maintained. Each subscription comes with a maximum number of software application development hours. If the anticipated developments can be accommodated within these hours, then there is no extra charge. If more than the allotted hours are needed, then the setup fee can be adjusted. Each annual extension of the subscription service includes a basic fee that includes a maximum number of hours of continued support that has to be paid for whether or not used by the subscriber.

2. Commodity Service Subscriber Subscription Agreements. Very much like the annual subscription fee agreement above, instead of the NPDP's use being restricted to just those with passwords, commodity service subscriber end users (customers) can have access to the NPDP at no charge. By way of example, an online locator service might subscribe to the NPDP so that the added detail, currency and accuracy of the NPDP can be applied to improve the quality of the locator service. In this instance, the commodity service subscriber is charged according to: the number of parcels they are allowed to access, the projected number of users and transactions, amount of expanded coverage they are willing to pay for, amount of improved data quality they are willing to pay for, scope of application development to be provided, and minimum specification for server operation quality standards. The application development in this case is limited to the parcel boundaries, not being linked to assessor's records so as not to "cheapen" the more advanced functionality available for "password" users of other service subscribers. On the other hand, commodity use of the NPDP requires far greater server capacity and operational requirements than that of the subscription fee users.

3. NPDP Data Sharing Alliance Agreements. Numerous data providers market and sell spatial data overlay information for use by clients and data subscribers that would be of interest to many NPDP service subscribers as well as transaction-based subscribers. Examples are flood zone boundaries, hazardous waste site boundaries, other hazard zones, environmentally sensitive areas (wetlands, rare and endangered flora and fauna ranges), detailed demographic data and business information spatial databases to mention just a few. Under data sharing alliance agreements, NPDP subscribers would be encouraged to access data sharing alliance partner's web sites to apply their overlays to meet their information needs. In some, but not all such transactions, applications are in place so that the information provided by the data sharing alliance partner can be viewed and cross analyzed (intersected, point-in-polygon, line-in-polygon, polygon-in-polygon) with the NPDP parcel overlay and links to attribute data files. Possible revenue generation terms and conditions could include: commissions to the NPDP service provider for revenues that flow to data partner referred from the NPDP web site, subscriptions fees paid to the NPDP service provider for a minimum number of transactions generated by end user referred by NPDP site to data partner to be exceeded as transactions exceed projected transaction levels, and commissions paid to the NPDP provider by server operators acting as portal-of-portals for all forms of computerized geographic information including remote sensing and aerial photo generated imagery, variety of municipal and regional spatial data overlays and other agreed data types. Such commissions can be on a transaction basis or on a percentage of subscription fees paid to the alliance partner for subscription to a broad array of spatial data that included the parcel overlay provided by the NPDP.

4. Transaction-Based Subscription Agreements. Once the NPDP becomes well enough known that demand for its use by the general public emerges, a per transaction fee offering is implemented to accommodate such uses as to: compare assessed value per square foot of improvements of a subject property(s) with that of surrounding parcels with identical use codes to verify whether or not you are being over assessed, evaluate the efficacy of a personal real estate investment anywhere in the country, perform environmental due diligence operations relative to a subject property, community/neighborhood associations referencing the NPDP to support of specific/community/urban design advocacy planning programs, and analyze compliance of a proposed development project with local general plan/zoning/design review requirements.

For the transaction user to attain access to the NPDP, they sign-up providing subscriber information including credit card numbers to which transactions are to be charged. Upon receiving their password, they select from a menu the basic functions they want to perform. Following the prompts, they retrieve the area of interest and perform the transaction for a prescribed period of time. The fee is charged to their credit card. At all times, such transactions are single subscriber, single session, single fee based. Individuals may purchase a NPDP "card" much like a telephone calling card and use it indiscriminately until they use it up and pay a restoration fee to continue use. At all times, such transactions are single user, single session, single fee based. Transaction based services can be extended to small business or businesses subject to only casual use. In this case, the assigned NPDP card can come with a small number of passwords for multiple use within the company. Unlike the subscription users, transaction users may not be entitled to custom application development services.

Having thus described the establishment and maintenance of the NPDP and the various business models for generating revenue from its use, it should be understood that various modifications to the above invention including the creation, operation and maintenance of the NPDP and the business models contemplated and should be considered to be within the scope of this invention without deviating from the spirit thereof. It should be appreciated that under certain circumstances the service provider can provide NPDP functionality directly to end users, with enriched data versions offered by the NPDP provider or by licensed service subscribers who in turn may set the terms and conditions for access to the NPDP and attendant data available from their specialized site. It is also contemplated that other independent public and private data sponsors could be provided with links as part of the NPDP display which end users could access on a free or fee basis.

What I claim is:

1. A method for selecting a parcel to be viewed along with adjacent and surrounding parcels on the display screen of a computer, wherein the data used to describe the selected parcel, and adjacent and surrounding parcels is obtained from a multi-jurisdictional, digital parcel boundary polygon map database, and wherein said selected parcel and the adjacent and surrounding parcels lie within or cross the extents of a bounding box whose coordinates are selected to cover the viewing extents of the portion of a display screen devoted to a parcel boundary polygon map, the method comprising:
    locating within a multi jurisdictional digital parcel map database the jurisdictional service area in which the selected parcel is located;
    locating within the pertinent jurisdictional service area the parcel boundary polygon of the selected parcel;
    creating a rectilinear bounding box to define a retrieval area;
    identifying whether additional jurisdictional service areas intersect the bounding box;
    selecting all parcel boundary polygons within each said jurisdiction within or crossing the bounding box;
    retrieving said parcel data from all jurisdictions located within the bounding box; and,
    providing said data for display on a computer screen.

2. The method of claim 1 wherein the multi jurisdictional digital parcel boundary polygon map database includes jurisdictions from two or more states.

3. The method of claim 1 wherein the parcel is selected by designating an address, a parcel identification number, or other parcel attribute.

4. The method of claim 1 wherein the parcel is selected by cursor placement within a parcel boundary polygon displayed on a computer screen.

5. The method of claim 1 wherein the parcel is selected by cursor placement within a parcel boundary polygon displayed on a computer screen and thereafter selecting the parcel by clicking or other end-user action.

6. The method of claim 1 wherein the bounding box crosses more than one jurisdictional area.

7. The method of claim 1 wherein the jurisdiction is a city, county, or other geopolitical area.

8. The method of claim 7 wherein the jurisdiction is a county and the county has associated with it a unique jurisdictional identifier.

9. The method of claim 8 wherein the unique jurisdictional identifier is a FIPS number.

10. The method of claim 8 wherein a selection set of jurisdictional identifiers is created corresponding to each county boundary present within or crossing the bounding box.

11. The method of claim 9 wherein if multiple county boundaries intersect the bounding box, a first jurisdictional identifier from said jurisdictional identifier selection set is used to select and access its associated county data to extract those parcels within the county which are to be displayed, the extracted parcels added to a parcel boundary selection set, the next jurisdictional identifier of said jurisdictional identifier selection set then used to select and access its associated county data to extract those parcels within its county which are to be displayed, the extracted parcels added to the parcel boundary selection set, this process repeated for all said jurisdictional identifiers of the jurisdictional identifier selection set until all jurisdictional identifiers have been similarly processed, and all such extracted parcels so identified added to the parcel selection set for display.

12. The method of claim 1 wherein when the extent of the view area to be displayed on a screen is changed, new bounding box coordinates are generated equal to the new screen viewing extents.

13. The method of claim 12 wherein when the extent of the view area is changed, a determination is made as to whether or not a different set of other jurisdictions are crossed by the bounding box, and whether or not additional parcel boundary polygon map data needs to be retrieved from those jurisdictions.

14. The method of claim 1 wherein the multi jurisdictional digital parcel polygon map database includes information about individual parcels normalized to a common spatial data protocol, including vector based polygon data used to describe each line segment defining the boundary of a property, each line segment encoded with a unique parcel identification number.

15. The method of claim 14 wherein each line segment is also encoded with the unique identification number of the parcel which lies to the other side of that line segment, moving from the beginning to the end of the line segment.

16. A method for retrieving and displaying geographic parcel boundary polygon maps comprising:
    receiving by a server a request for a parcel boundary polygon map area for a selected parcel based upon a street address;
    searching by the server a multi-jurisdictional digital parcel map database for the parcel boundary polygon record for the selected parcel boundary polygon having said street address, said boundary of said selected parcel, along with the parcel records of adjacent and surrounding parcels, said parcel records including the geocoded parcel boundary polygon data which defines each of the line segments for each of the adjacent and surrounding parcel boundary polygons;
    defining a rectilinear parcel boundary retrieval area, wherein four coordinates define said retrieval area;
    retrieving the geocoded polygon data for each of the parcel boundary polygons that fall within or cross said rectilinear retrieval area, which retrieved data is written to a selection set; and
    transmitting said selection set of retrieved parcel boundary polygon map data, said data including the parcel boundary polygon data for the selected parcel having said street address along with parcel boundary polygon data for the adjacent and surrounding parcels to a remote appliance having a screen display, wherein the transmitted parcel boundary polygon map data includes the selected parcel boundary polygon along with adjacent and surrounding parcels around the selected parcel the selected parcel boundary polygon highlighted or otherwise differentiated.

17. The method of claim 16 wherein the rectilinear parcel boundary retrieval area is equal to the screen extent of the remote appliance.

18. The method of claim 16 wherein the rectilinear parcel retrieval area comprises an offset distance which is a default distance.

19. The method of claim 16 wherein the rectilinear parcel retrieval area is comprises an offset distance which is set by a user.

20. The method of claim 16 wherein the selection set of retrieved data is modified each time the extent of the view area is changed.

21. The method of claim 20 wherein the extent of the view area is changed when a user pan or zooms on screen.

* * * * *